United States Patent Office 3,272,548
Patented Sept. 13, 1966

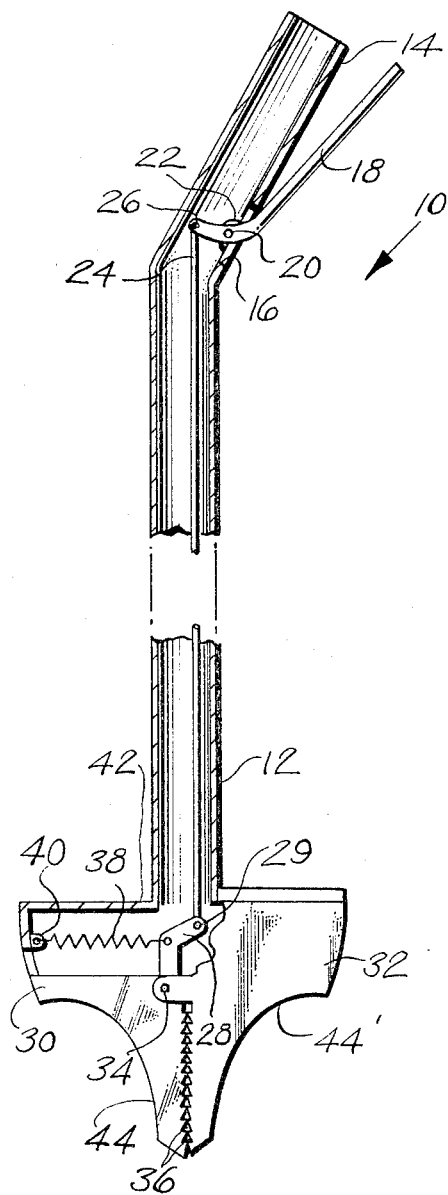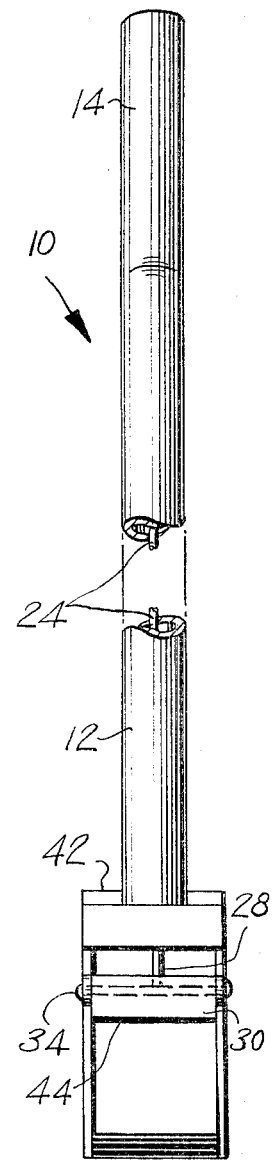

3,272,548
WEEDING TOOL
John W. Taylor, 310 Forest Park Drive,
Pensacola, Fla.
Filed Nov. 3, 1964, Ser. No. 408,513
3 Claims. (Cl. 294—50.9)

This invention relates to garden tools and more particularly to a manually operated hand tool for removing weeds.

It is an object of the present invention to provide a hand tool which will easily and effectively pull weeds and weed roots without the necessity of bending over or getting down on the hand and knees to pull weeds.

Another object of the present invention is to provide a weeding tool which will have a handle and a trigger connected to a movable jaw by cable or rod means, thus allowing the jaws to open to receive the weeds.

A further object of the present invention is to provide a weeding tool which will have spring means in one of the jaws to automatically close the jaws when the handle is released.

A still further object of the present invention is to provide a tool of the above mentioned type which will have jaws which are serrated enabling the tool to pull small weeds from flower beds and the like.

Other objects of the invention are to provide a weeding tool bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in elevation and partly in section; and FIGURE 2 is a front view of FIGURE 1.

Referring now more in detail to the drawing, a weeding tool 10 made in accordance with the present invention is shown to include an elongated hollow tubular handle 12 having an offset 14 at its upper extremity proving handle grip means for using weeding tool 10. An elongated opening 16 within offset 14 freely and slidably receives an elongated, L-shaped trigger 18 which provides a means for opening the jaws of the device which hereinafter will be described. A pivot pin 20 is transversely received through trigger 18 and is secured to a semi-circular lug 22 within offset 14 of handle 12 providing support means for trigger 18. Trigger 18 is pivotably secured to an elongated rod 24 by transverse pivot pin 26 and allows up and down motion of rod 24 within tubular handle 12. The lower extremity of rod 24 is pivotably secured to an angular lever 28 by means of a pivot pin 29. Lever 28 is secured to a jaw 30 of tool 10, and a mating jaw 32 is pivotably received by pin 34 to which lever 28 is secured. Jaws 30 and 32 are provided with serrations 36 to enable the pulling of young weeds from a garden, or the like. A coil spring 38 is secured to an internal lug 40 of jaw 30 and the other end of spring 38 is secured to lever 28 providing return means for jaw 30 when trigger 18 is released. A plate 42 is fixedly secured to the lower extremity of tubular handle 12 and provides support means for the jaws 30 and 32 respectively. Jaws 30 and 32 are provided with arcuate openings 44 and 44' respectively thus allowing weeding tool 10 not to dislodge too much soil during operation.

In use, handle 12 is grasped in one hand and the offset 14 is grasped in the other hand by the operator, and with the hand gripping offset 14, trigger 18 is urged toward offset 14 which will, in turn, urge rod 24 downwardly, thus pivoting jaw 30 by means of lever 28 open to receive the weed and weed roots. By moving jaws 30 and 32 back and forth by means of handle 12, tool 10 dislodges the soil when trigger 18 is released by the operator, spring 38 pulls upon lever 28, thus closing jaw 30 and the serrations 36 of jaws 30 and 32 grippingly engage the weed, whereupon the user lifts weeding tool 10 withdrawing the weed and weed roots from the soil.

It shall be recognized that the incorporation of cable in placing of the operating rod and its associated trigger of the invention may be used in the structure herein described to accomplish the same purpose.

While various changes may be made in the detail construction, it shall be understood that such changes shall be within the spirit and scope of the present invention as defined by the appended claims.

What I claim as new and desire to protect by Letters Patent of the United States is:

1. A weed pulling tool comprising, in combination, an elongated vertically extending handle member; a pair of normally closed gripping jaws attached to the lower end of said handle member; means pivotally mounting one of said jaws for movement toward and away from the other jaw, a trigger member pivotally attached to the upper end of said handle; a vertically extending elongated operating rod pivotally attached at one end to said trigger, lever means attached to said one jaw; said lever having an upstanding portion and a laterally offset portion extending in the direction toward said other jaw; means pivotally connecting said rod to said offset portion of said lever for moving one jaw away from the other; and horizontally positioned spring means attached to the upstanding portion of said lever urging said one jaw toward the other.

2. The combination according to claim 1, wherein said handle is tubular and said rod is received freely therein.

3. The combination according to claim 1, wherein the jaws are tapered for easy insertion into the soil and the gripping surfaces are serrated.

References Cited by the Examiner
UNITED STATES PATENTS

| | | | |
|---|---|---|---|
| 1,024,500 | 4/1912 | Dahle | 294—50.9 |
| 1,082,547 | 12/1913 | Nuttall | 294—50.9 |
| 1,758,526 | 5/1930 | Lewis | 294—50.9 |
| 2,770,483 | 11/1956 | Patnaude | 294—50.9 |

WILLIAM FELDMAN, Primary Examiner.

OTHELL M. SIMPSON, Examiner.